Feb. 2, 1960 C. GABRIELSEN 2,923,392
HORIZONTAL CONVEYOR SANDWICH MERCHANDISING MACHINE
Filed April 30, 1953 4 Sheets-Sheet 1
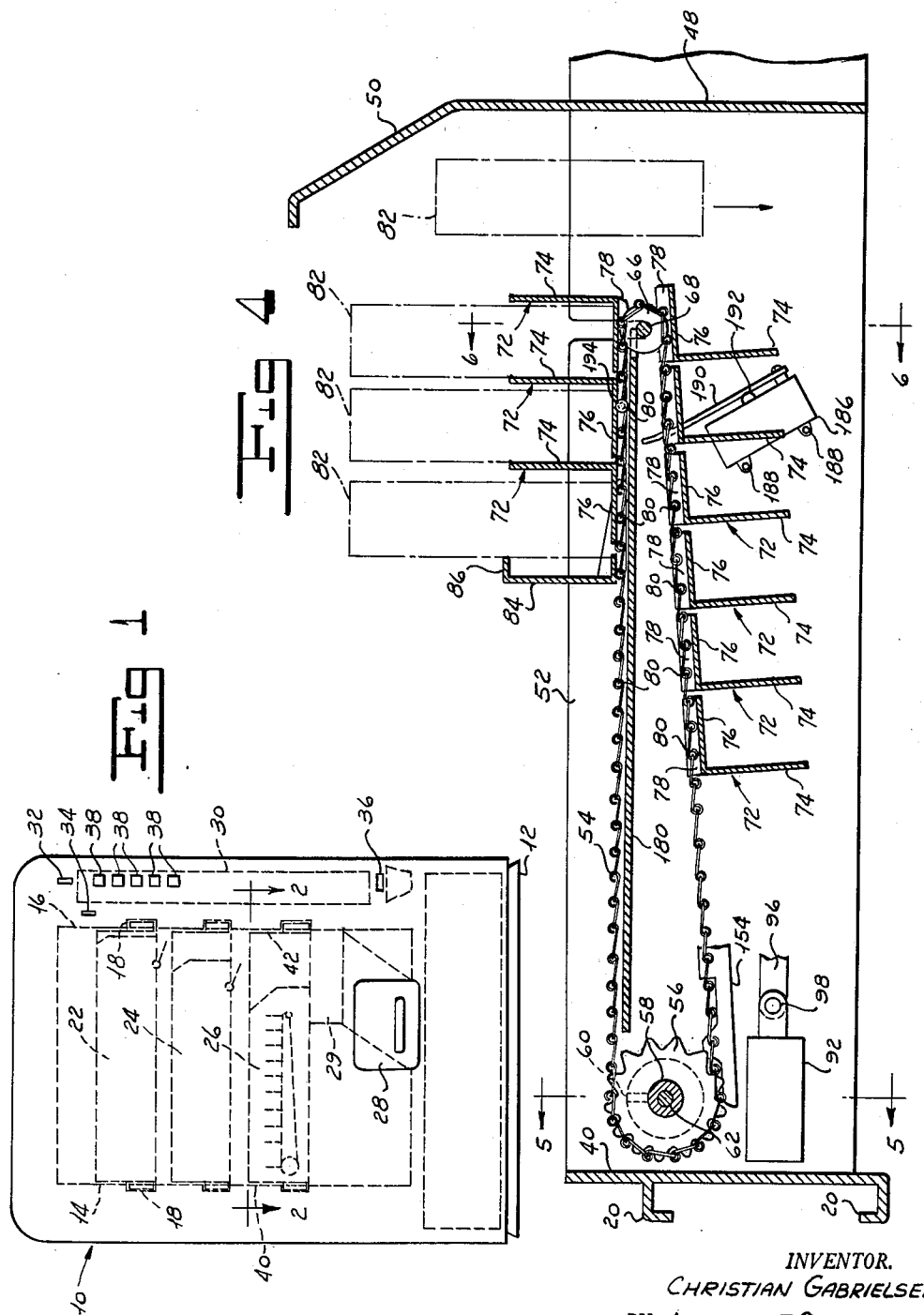
INVENTOR.
CHRISTIAN GABRIELSEN
BY Henry L. Shenier
ATTORNEY Feb. 2, 1960        C. GABRIELSEN        2,923,392
HORIZONTAL CONVEYOR SANDWICH MERCHANDISING MACHINE
Filed April 30, 1953        4 Sheets-Sheet 2
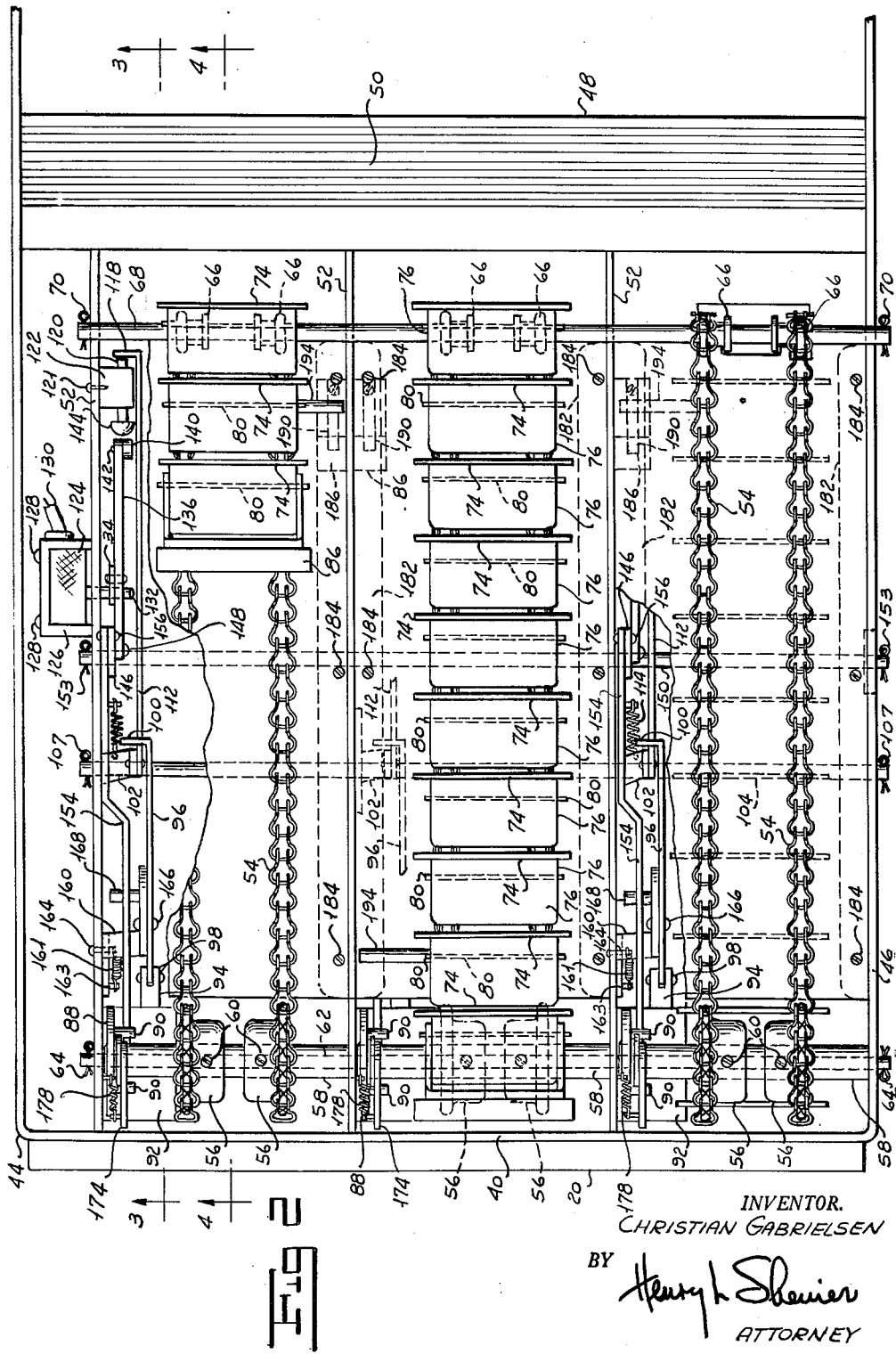
INVENTOR.
CHRISTIAN GABRIELSEN
BY
ATTORNEY

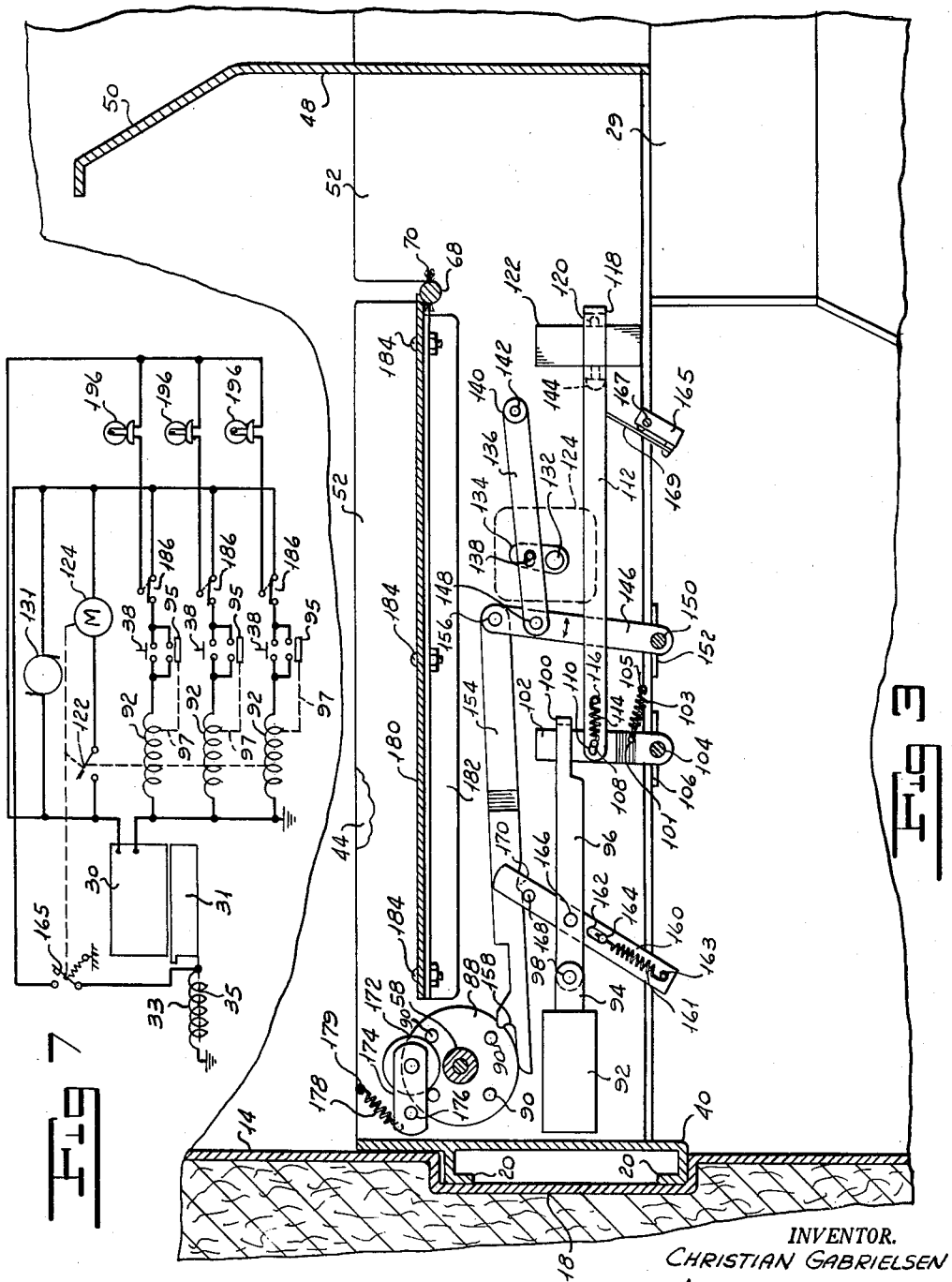

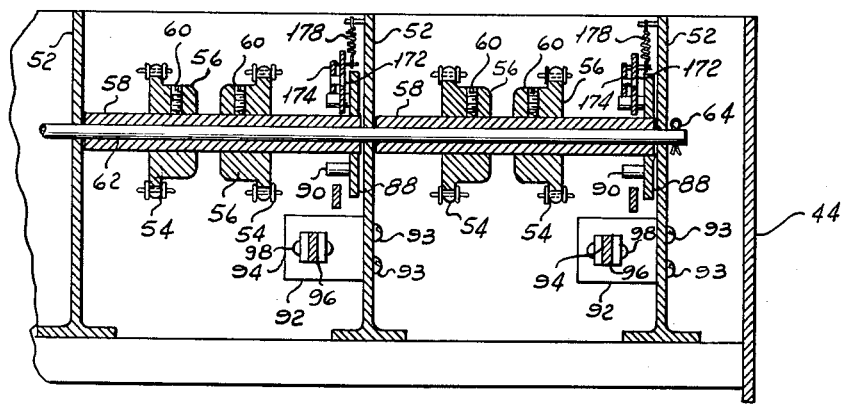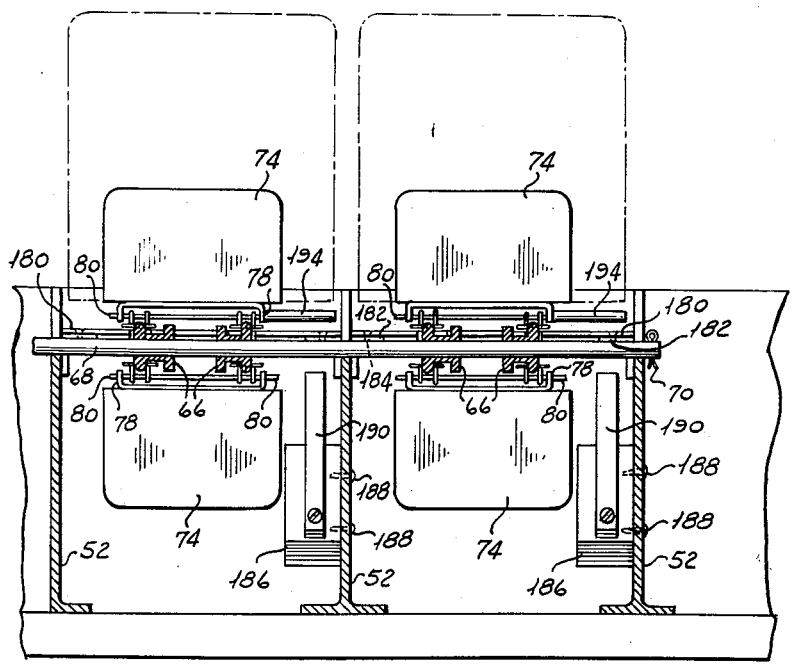

United States Patent Office 2,923,392
Patented Feb. 2, 1960

2,923,392

HORIZONTAL CONVEYOR SANDWICH MERCHANDISING MACHINE

Christian Gabrielsen, Mountain Lakes, N.J., assignor to Rowe Manufacturing Co., Inc., Whippany, N.J., a corporation of New York Application April 30, 1953, Serial No. 352,103

6 Claims. (Cl. 194—2)

My invention relates to a merchandising machine and more particularly to an improved merchandising machine in which the articles of merchandise are arranged on one or on a plurality of horizontal conveyors.

Merchandising machines of the prior art generally have the merchandise to be dispensed arranged therein in a plurality of vertical columns. This arrangement is undesirable in some locations, since it may obstruct the view or may be impracticable due to space considerations. In addition, merchandising machines of the prior art generally employ some positive means for ejecting an article of merchandise. As a result, if the article itself is not strong structurally, it must be boxed or placed in some substantial container in order that it will not be damaged or crushed by the ejecting member. These machines are also subject to occasional jamming, since the article of merchandise may be tumbled in moving from its carrier into the delivery chute. To prevent such jamming, the delivery chute must be of an inordinate size.

I have invented an improved merchandising machine adapted to dispense articles of merchandise such as sandwiches or the like which provides a large capacity relative to the size of the machine. The merchandise in my machine is arranged in horizontal rows and is dropped into the delivery chute by gravity without tumbling, so that the merchandise is not crushed or damaged by a dispensing member, and the possibility of the merchandise jamming in the chute is substantially eliminated. Since the article of merchandise is not tumbled into the delivery chute, the chute may be small and the capacity of my machine is relatively large for its size.

One object of my invention is to provide an improved merchandising machine in which the articles of merchandise are arranged in one or in a plurality of horizontal rows.

Another object of my invention is to provide an improved merchandising machine in which the article of merchandise to be dispensed is dropped into the delivery chute by gravity without tumbling and without the use of ejectors, which would crush or damage the merchandise.

A further object of my invention is to provide an improved merchandising machine including stop means associated with each section to prevent operation of the section when its respective supply of merchandise is exhausted.

A still further object of my invention is to provide an improved merchandising machine including means for resetting the selecting means after a dispensing operation.

Other and further objects of my invention will appear from the following description.

In general my invention contemplates the provision of a merchandising machine for sandwiches or the like including a housing containing a plurality of horizontal conveyors disposed in side-by-side relationship. Each of the conveyors mounts a plurality of merchandise carriers for movement therewith. I provide a common drive means for all the conveyors and means for selectively determining which of the conveyors shall be driven by the drive means during a particular dispensing operation. In addition, individual empty switches are associated with the respective conveyors to open the selecting circuit corresponding to a conveyor and operate appropriate signal means when the conveyor is empty. Means is provided for resetting the selecting means when a dispensing operation has been completed.

In the accompanying drawings which form part of the instant specification and which are to be read in conjunction therewith and in which like reference numerals are used to indicate like parts in the various views:

Figure 1 is a front view of my improved sandwich merchandising machine.

Figure 2 is a sectional plan drawn on an enlarged scale, taken along the line 2—2 of Figure 1, with parts broken away.

Figure 3 is a sectional elevation drawn on an enlarged scale, taken along the line 3—3 of Figure 2.

Figure 4 is a sectional view drawn on an enlarged scale, with parts omitted, taken along the line 4—4 of Figure 2.

Figure 5 is a fragmentary sectional view drawn on an enlarged scale, taken along the line 5—5 of Figure 4.

Figure 6 is a fragmentary sectional view drawn on an enlarged scale taken along the line 6—6 of Figure 4.

Figure 7 is a schematic view showing the electrical circuits of my improved sandwich merchandising machine.

More particularly referring now to the drawings, I provide a housing, indicated by the reference character 10, mounted on a base 12 and having panels 14 and 16 mounted within and adjacent the respective sides of housing 10. Panels 14 and 16 are provided with recesses 18 for engagement with corresponding flanges 20 on each of the merchandising units 22, 24 and 26 removably to mount the units within the housing 10. The upper two merchandising units 22 and 24 may, for example, contain refrigerated packages of merchandise and be of the type disclosed in my copending application, Serial No. 196,497, filed November 18, 1950, for Refrigerated Package Vending Machine, now Patent No. 2,719,651, issued October 4, 1955. The lowest unit 26 may be a unit of the type disclosed herein adapted to dispense merchandise such as sandwiches or the like.

Below the lowest unit 26 in the face of housing 10 I provide a door 28 which opens into the delivery chute 29 of the machine. In the space between panel 16 and the corresponding side of housing 10, I mount a coin register and selecting mechanism 30 of any appropriate construction such as shown in the copending application of Christian Gabrielsen and John F. Morrison, Serial No. 166,045, filed June 3, 1950, now Patent No. 2,677,450, issued May 4, 1954. In the face of the housing in front of the register 30 I provide a coin slot 32, a coin return lever 34, a coin return recess 36, all well known in the art, and a plurality of selecting buttons 38. As will be made clear by reference to Figure 7, the coin register 30 includes a coin tray 31 adapted to be tilted by a solenoid 33 acting through a linkage 35 in a direction to accept the coins deposited in slot 32. Solenoid 33 is energized in a manner to be described to tilt the coin tray when a dispensing operation has been completed. The top two selecting buttons 38 may, for example, be arranged to select merchandise from the respective units 22 and 24, which may contain, for example, milk and chocolate milk, respectively. The three lower buttons 38 may select one of the various types of merchandise, such as kinds of sandwiches arranged within the merchandising unit 26. It will be appreciated that I am not restricted to the arrangement described above. Units 22, 24 and 26 could, for example, contain, respectively, different types or kinds of sandwiches. Likewise, I could arrange my machine to dispense only one kind of milk and have two units of sandwiches. Appropriate connections can be made to the selecting buttons 38 so that they select the proper type merchandise, for example, as shown in Figure 7 as will be readily understood by those skilled in the art.

Each of the merchandising units 26 is made up of a panel 40, hereinafter referred to for convenience as the "back" panel, and a second panel 42, hereinafter referred to for convenience as the "front" panel, which panels can be seen in Figure 1, and a pair of side panels 44 and 46, best shown in Figure 2. A short distance behind front panel 42 I mount a panel 48 between side panels 46 and 44, which panel 48 has a portion 50 bent back toward back panel 40, as can be seen by reference to Figure 4. A plurality of partitions 52 divide the space bounded by side panels 44 and 46, rear panel 40 and panel 48 into a number of dispensing compartments.

Within each of the compartments, I mount a pair of chains 54 carried by drive sprockets 56 mounted on sleeves 58 by means of set screws 60. The sleeve 58 of each compartment is rotatably mounted on a rod 62 extending across all the compartments and retained in side panel 46 and the partition 52 adjacent the other side panel 44 by means of cotter pins 64. Chains 54 are also carried by idler sprockets 66 rotatably mounted on a rod 68 extending across all the compartments and retained in side panel 46 and the partition 52 adjacent side panel 44 by cotter pins 70. Each pair of chains within a respective compartment forms a conveyor on which I mount a plurality of merchandise carriers indicated generally by the reference character 72. Each carrier 72 has a flange 74 upstanding from the plane of the conveyor with which it is associated and a base 76 in the plane of its conveyor. The base 76 of each carrier 72 has a pair of flanges 78 thereon by means of which it is mounted on a pin 80 extending between the chains 40 forming its associated conveyor. An article of merchandise such as a sandwich or the like shown in broken lines and indicated by the reference character 82, is placed on each carrier in the manner illustrated in Figure 4.

It is to be noted that I mount a loading member 84 behind the last carrier 72, as shown in Figure 4. Loading member 84 has a flange 86 formed thereon by means of which the member may be grasped to draw the conveyor back into a position where its carriers may be loaded after the supply of merchandise has been depleted.

Within each compartment, on sleeve 58 for rotation therewith, I mount a disk 88 having a number of radially spaced, axially projecting pins 90 on one side thereof. It will be appreciated that if disk 88 is rotated, the drive sprockets 56 on the same sleeve 58 will also be rotated to drive chains 54. Also within each compartment on a partition 52 I mount a solenoid 92, by means such as bolts 93, having an armature 94 to which is connected a link 96 by means of a pin 98, as can be seen by reference to Figure 3. Referring now to Figure 7, each of the solenoids 92 actuates a holding means 95 associated with the respective selecting button 38 through a linkage 97. Each of the holding means 95 maintains the circuit of the associated solenoid 92 until the coins are accepted by coin register 30 and the solenoid is de-energized. Link 96 has a foot or lug 100 at its end remote from pin 98 for engagement with an arm 102 mounted on a shaft 104 extending across all the compartments and retained in brackets 106 formed on the lower ends of side panel 46 and the partition 52 adjacent panel 44 by cotter pins 107. The mechanism thus far described is common to all compartments. It will be appreciated that when arm 102 in any of the compartments is rotated by link 96, the arms 102 in the remainder of the compartments will also be rotated, since all the arms 102 are fixed on the common shaft 104. Shaft 104 is normally urged in a clockwise direction as viewed in Figure 3 by means of a spring 103 fixed at one end by suitable means such as a pin 101 to the arm 102 in the compartment adjacent side panel 44 and at the other end to the partition 52 adjacent side panel 44 by any convenient means such as a rivet 105.

Referring now to Figure 3, the arm 102 in the compartment adjacent side panel 44 has a pin 108 thereon which rides in a slot 110 in one end of a starting link 112. A spring 114 extends between pin 108 and a pin 116 carried by link 112. Pin 108 riding in slot 110 and the resilient connection 114 between pin 108 and pin 116 provide a lost motion connection between arm 102 and link 112 to provide ease in assembly and preclude actuation of the starting button by jarring the machine. On the right-hand end of link 112 is viewed in Figure 3, I form a foot 118 adapted to engage the start button 120 of a motor start switch 122 mounted on the partition 52 adjacent side panel 44 by screws 121. Motor switch 122 completes the circuit of a motor 124 mounted in a bracket 126 fixed to the partition 52 adjacent side panel 44 by means of screws 128 as can be seen by reference to Figure 2. Motor 124 has electrical connections 130, a power supply 131 and drives a stub shaft 132. Shaft 132 has a crank 134 fixed thereon which drives a link 136 through a pin 138 as can best be seen by reference to Figure 3. One end of link 136 has a roller 140 carried by a pin 142 thereon. Roller 140 is adapted to engage the stop button 144 on switch 122 near the end of the cycle of the motor. The other end of link 136 is connected to an arm 146 by a pin 148. Arm 146 is fixed on a shaft 150 extending across all the compartments and held in position within brackets 152 on side panel 46 and the partition 52 adjacent panel 44 by cotter pins 153. Arm 146 is duplicated in all the other compartments except for the connection to link 136.

When the arm 146 in the left-hand compartment as viewed in Figure 2 is driven by the link 136, all the corresponding arms 146 are driven, since they are fixed on a common shaft 150. The ends of the arms 146 remote from the ends mounted on shaft 150 are connected to actuating links 154 by pins 156. The ends of links 154 remote from pins 156 are formed with sockets 158 adapted to engage one of the pins 90 on a respective disk 88 when properly positioned. Within each of the compartments a selecting arm 160 is mounted on a pin 164 on a partition 52 by means of a slot 162. A spring 161 between pin 164 and means such as a rivet 163 on the end of arm 160 provides a lost motion connection and permits the seating of the end of link 154 by spring pressure. Arms 160 are connected to links 96 by pins 166 and have pins 168 adjacent their upper ends for engagement with the respective links 154 to raise a selected link to operative position. Each of the links 154 is provided with a reset notch 170 for engagement with pin 168 to reset the selected solenoid when moved to the right as viewed in Figure 3 after a dispensing operation. The spring 161 connected at one end to the pin 164 carried by the frame and extending through slot 162 in arm 160 and at the other end to a pin 163 is in tension normally to urge arm 160 to a position at which pin 164 is in engagement with the lower end of slot 162 as viewed in Figure 3. When solenoid 92 is energized it moves link 96 to the left as viewed in Figure 3. Since spring 161 seats arm 160 on pin 164 when link 96 moves to the left arm 160 pivots around pin 164 to cause a pin 168 on the end of the arm to cam the corresponding actuating link 154 to its operative position. The pivotal connection of link 96 to armature 94 permits this movement of arm 160. It will be appreciated that if more than a predetermined resistance is encountered in the movement of arm 160 spring 161 permits relative movement between arm 160 and pin 164 to avoid damage to the parts. As has been explained hereinabove, spring 161 is sufficiently strong to permit pivotal movement of arm 160 to cause pin 168 to raise its associated link 154 to operative position unless the link is for any reason prevented from moving. In the course of a dispensing operation to be described hereinafter, the arms 146 oscillate to move their links 154 first to the left and then to the right as viewed in Figure 3. In the course of movement of an operative link 154 to the left its socket 158 engages a pin 90 to cause an article to be dispensed. On the movement of an operative link to the right the edge of its notch 170 engages the pin 168 on arm 160 to return the actuated arm to its initial position. In the course of this movement armature 94 is returned to its initial position owing to the connection between arm 160 and the link 96 connected to the pin 98.

A normally open switch 165 is fixed on the partition 52 adjacent side panel 44 by any convenient means such as a screw 167 and has an arm 169 for closing the switch. The switch 165 is mounted so that its arm 169 is in a position to be engaged by roller 140 at a time prior to the time the roller engages motor stop button 144. As can be seen by reference to Figure 7, when roller 140 engages arm 169 to close switch 165, solenoid 33 is energized to tilt coin tray 31 in a direction to accept coins deposited therein.

A shaft 176 on each of the partitions 52 carries a lever 174 and a disk 172 arranged to cooperate with pins 90 on disk 88. Disk 172 is normally urged downwardly as viewed in Figure 3 by a spring 178 fixed at one end to an end of lever 174 and at its other end to partition 52 by appropriate means such as a rivet 179. Disk 172 in its normal position between dispensing operations rides between a pair of pins 90 to prevent overrun of disk 88 after an actuation.

Each of the compartments is provided with a cover plate 180 fixed on angle brackets 182 by means of screws 184. Angle brackets 182 are mounted on the partitions 52 by any appropriate means such as spot welding or the like. Cover plates 180 extend generally between the sprocket wheels 56 and 66 as can be seen by reference to Figure 4. The tops of sprockets 56 and 66 extend above the corresponding surfaces of cover plates 180 so that the chains 54 pass over plates 180 between the sprockets.

For each compartment, I provide an empty switch 186 mounted on a partition 52 by appropriate means such as screws or rivets 188. Each of the switches carries an arm 190 adapted to engage the switch actuating button 192. On the next to last carrier 72, as viewed in Figure 4, I provide a rod 194 extending in such a direction as to engage arm 190 to operate the empty switch when the rod 194 is moved to a position corresponding to a position where the last carrier has dispensed its article of merchandise. This switch opens the selecting circuit associated with the compartment and lights appropriate signal means, such as a lamp 196 or the like, to indicate that the section is empty, as shown in Figure 7.

It is to be understood that each of the compartments formed by the partitions 52 may contain a different kind of sandwich. Each of the solenoids 92 of the compartments is associated with a different selecting button 38 on the face of the machine so that the customer may select the type sandwich desired.

In use, the customer first deposits the required amount in coins in the coin slot 32 on the face of the machine to energize the coin register 30, as is well known in the art. He then pushes the selecting button 38 corresponding to the type sandwich desired, thus completing the circuit through one of the solenoids 92. When a solenoid 92 is energized, it draws its associated armature 94 to the left as viewed in Figure 3 thus moving link 96 to the left and closes its holding means 95, indicated in Figure 7, through linkage 97 indicated schematically in Figure 7. This motion also rotates selecting arm 160 in a counterclockwise direction about its pivot 164. This latter motion causes pin 168 to raise the selected actuating link 154 to a position where it will engage one of the pins 90 of disk 88. The lost motion connection provided by spring 161 and slot 162 will ensure that actuating link 154 will seat under spring pressure.

When the link 96 is moved to the left, it rotates arm 102 and thereby shaft 104 in a counterclockwise direction as viewed in Figure 3 by means of its foot 100 against the action of spring 103. When shaft 104 rotates, all the arms 102 rotate, since they are all fixed on the common shaft 104. The arm 102 in the left-hand compartment as viewed in Figure 2 will move link 112 to the left as viewed in Figure 3 through the medium of spring 114 so that foot 118 of link 112 will engage start button 120 to start motor 124.

Motor 124 is shown with its crank 134 in the neutral position in Figure 3; that is, the position before a dispensing operation has been initiated. When shaft 132 is rotated by motor 124 in a counterclockwise direction, crank 134 fixed on motor shaft 132 moves link 136 first to the left as viewed in Figure 3. This results in a counterclockwise rotation of link 146 and its shaft 150. Since all the links 146 are fixed on the common shaft 150 for rotation therewith, all will be moved initially to the left when a dispensing operation is initiated, so that all the links 154 will be moved to the left. However, only the actuating link 154 which has been raised to an operative position upon actuation of its associated solenoid 92 through the medium of a selecting arm 160 will engage a pin 90 on the corresponding disk 88.

When an actuating link 154 engages a pin 90 during its movement to the left, the associated sprocket wheels 56 are rotated in a direction to advance the carriers 72. When the carriers 72 are advanced, the foremost carrier 72 as shown in Figure 4 will be carried around idler sprocket wheels 66. During the movement of a carrier around idler sprockets 66, the article of merchandise 82 in the carrier will also be carried around. It will not, however, be tumbled into the dispensing chute. Its top will first engage the portion 50 of panel 48 so that it is held in a substantially upright position during the movement of carrier 72 around sprocket 66. As carrier 72 continues around the sprocket, it is carried out from under the merchandise 82, and the merchandise is dropped by gravity into the dispensing chute remaining substantially vertical. It will be appreciated that since the sandwich is not tumbled down into the chute considerable space may be saved by having a relatively narrow chute and the chance of jamming in the chute minimized. In addition, there is no positive force applied to the article of merchandise during the dispensing operation, so that the possibility of crushing the article of merchandise is substantially eliminated.

When motor shaft crank 134 has passed through approximately the first quadrant of its rotation from the neutral position illustrated in Figure 3, actuating link 154 is withdrawn from the pin 90 which it engaged. As the crank 134 rotates further, roller 140 will move downwardly and to the right as viewed in Figure 3 to engage arm 169 of switch 165 to close the switch. When switch 165 closes, solenoid 33 is energized and tilts coin tray 31 through linkage 35 in a direction to accept the coins, as will be seen by reference to Figure 7. When the coins are accepted, the circuit through coin register 30 and thus through the energized solenoid 92, is interrupted and the associated holding means 95 opens. After the selected solenoid is de-energized, arm 154 is moved further to the right as viewed in Figure 3 by crank 134 through link 136. Reset notch 170 of arm 154 engages pin 168 and rotates the associated selecting arm 160 clockwise to reset the selected solenoid by moving link 96 to the right. Spring 103 rotates shaft 104 clockwise as viewed in Figure 3 thus resetting all the arms 102 and the starting link 112 connected to the arm 102 in the compartment adjacent side panel 44. This action of spring 103 assists the resetting of the link 96 and the selected solenoid 92 through foot 100. When motor crank 134 nears the end of a cycle of rotation, roller 140 engages stop button 144 to stop motor 124 with crank 134 in substantially the neutral position shown in Figure 3 and the machine is ready for the succeeding dispensing operation. It is to be noted that disk 172 has stopped the actuated disk 88 in a predetermined position so that one of its pins 90 is in a position to be engaged by the associated link 154 when the corresponding solenoid 92 is next energized.

When the last carrier 72 of a particular compartment has reached a dispensing position, the rod 194 on the next to last carrier engages arm 190 of empty switch 186 and forces the arm to actuate button 192 to open the selecting circuit corresponding to the compartment and actuate appropriate signal means.

Thus it will be seen that I have accomplished the objects of my invention. I have provided an improved merchandising machine adapted to dispense merchandise such as sandwiches or the like, in which the dispensing means are arranged in a plurality of horizontal rows disposed in side-by-side relationship. My improved merchandising machine provides a large capacity relative to the space occupied and dispenses articles of merchandise without the application of a positive force to the article. Thus the necessity for boxing the merchandise is eliminated. The merchandise is not tumbled into the chute but remains substantially vertical during the dispensing operation so that the chance of a sandwich jamming in the chute is minimized. In addition I have provided a merchandising machine capable of selectively dispensing various kinds of merchandise and have provided each compartment with empty switch means to prevent actuation of the particular section and to operate appropriate signal means when the supply of merchandise in the compartment or section has become depleted.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A merchandising machine including in combination a plurality of horizontal conveyors, each of said conveyors comprising means for supporting a supply of articles of merchandise to be dispensed, a delivery chute, drive means adapted to be energized to advance said conveyors a predetermined distance in a dispensing direction toward said chute, said drive means including respective normally inoperative actuating links associated with said conveyors, respective selecting means each including a selecting arm associated with an actuating link and a solenoid adapted to be energized upon actuation of the selecting means to operate the associated selecting arm to move the corresponding actuating link into operative position, and means responsive to the actuation of any one of said selecting means for energizing the drive means to advance the conveyor corresponding to the actuated selecting means through a predetermined distance in a dispensing direction to cause an article of merchandise to be delivered to said chute.

2. A merchandising machine as in claim 1 including means responsive to movement of a conveyor for disabling the associated selecting means when the supply of articles on said conveyor is exhausted.

3. A merchandising machine as in claim 1 including means responsive to movement of said drive means for de-energizing said drive means.

4. A merchandising machine as in claim 1 in which each of said selecting arms carries a pin and in which each of said actuating links is provided with a reset notch for engaging said pin upon movement of said link to reset said arm.

5. A merchandising machine including in combination a plurality of horizontal conveyors, each of said conveyors comprising means for supporting a supply of articles of merchandise to be dispensed, a delivery chute, drive means adapted to be energized to advance said conveyors a predetermined distance in a dispensing direction towards said chute, said drive means including respective normally inoperative actuating links associated with said conveyors, respective selecting means, each of said selecting means including a selecting arm associated with an actuating link and means mounting said selecting arm for movement from an initial position to an operative position at which it moves the corresponding actuating link to its operative position and for return movement to its initial position, each of said selecting means including a solenoid adapted to be energized upon actuation of the selecting means to move the associated selecting arm to its operative position to move the corresponding actuating link into operative position, means responsive to the actuation of any one of said selecting means for energizing the drive means to advance the conveyor corresponding to the actuated selecting means through a predetermined distance in a dispensing direction to cause an article of merchandise to be delivered to said chute, and means responsive to the operation of the selected actuating link for returning the operated selecting arm to its initial position.

6. A merchandising machine including in combination a plurality of horizontal conveyors, each of said conveyors comprising means for supporting a supply of articles of merchandise to be dispensed, a delivery chute, drive means adapted to be energized to advance said conveyors a predetermined distance in a dispensing direction towards said chute, said drive means including respective normally inoperative actuating links associated with said conveyors, a coin mechanism including a coin tray for receiving and supporting coins deposited in said mechanism and means for moving said tray in a direction to accept coins, respective selecting means each including said coin mechanism and a selecting arm associated with an actuating link and a solenoid adapted to be energized upon the deposit of a predetermined sum in coins and upon the actuation of the selecting means to operate the associated selecting arm to move the corresponding actuating link into operative position, means responsive to the actuation of any one of the selecting means for energizing the drive means to advance the conveyor corresponding to the actuated selecting means through a predetermined distance in a dispensing direction to cause an article of merchandise to be delivered to said chute, and means responsive to movement of said drive means for actuating said coin tray movement means.

References Cited in the file of this patent

UNITED STATES PATENTS

| | | |
|---|---|---|
| 919,824 | Chisolm | Apr. 27, 1909 |
| 936,906 | Jewell | Oct. 12, 1909 |
| 1,052,607 | McBride et al. | Feb. 11, 1913 |
| 1,716,266 | Flamm | June 4, 1929 |
| 1,860,028 | Head | May 24, 1932 |
| 1,986,714 | Clayton | Jan. 1, 1935 |
| 2,253,447 | Stanford | Aug. 19, 1941 |
| 2,323,517 | Clem | July 6, 1943 |
| 2,436,223 | Newcomer | Feb. 17, 1948 |
| 2,437,425 | Goodhue et al. | Mar. 9, 1948 |
| 2,590,736 | Tandler et al. | Mar. 25, 1952 |
| 2,599,173 | Hamilton | June 3, 1952 |
| 2,599,906 | Farmer | June 10, 1952 |
| 2,765,101 | Shanhouse et al. | Oct. 2, 1956 |

FOREIGN PATENTS

| | | |
|---|---|---|
| 210,788 | Germany | June 11, 1909 |
| 330,525 | Great Britain | June 10, 1930 |
| 660,354 | Germany | May 24, 1938 |